United States Patent [19]

Kawamura et al.

[11] Patent Number: 5,758,254
[45] Date of Patent: May 26, 1998

[54] METHOD OF RECOVERING RADIOACTIVE BERYLLIUM

[75] Inventors: Hiroshi Kawamura, Higashiibaraki-Gun; Katsuyoshi Tatenuma, Mito; Yoshio Hasegawa, Kashima-Gun; Taketoshi Takeuchi, Mito; Naoki Sakamoto, Higashiibaraki-Gun, all of Japan

[73] Assignees: Japan Atomic Energy Research Institute; NGK Insulators, Ltd., both of Japan

[21] Appl. No.: 707,401

[22] Filed: Sep. 4, 1996

[30] Foreign Application Priority Data

Mar. 5, 1996 [JP] Japan .................... 8-078181

[51] Int. Cl.$^6$ .................................................. C01F 3/00
[52] U.S. Cl. ................... 423/2; 423/134; 976/DIG. 391; 75/593
[58] Field of Search .................... 423/2, 134, 241; 976/DIG. 391; 75/593

[56] References Cited

U.S. PATENT DOCUMENTS

| | | | |
|---|---|---|---|
| 2,982,644 | 5/1961 | Kamlet et al. | 75/593 |
| 3,419,348 | 12/1968 | Hardy et al. | 423/200 |
| 3,669,649 | 6/1972 | Olson et al. | 423/132 |
| 3,716,616 | 2/1973 | Lin | 423/134 |
| 3,719,472 | 3/1973 | Lerman | 75/84 |
| 3,879,520 | 4/1975 | Sands | 423/5 |

OTHER PUBLICATIONS

"Beryllium Electrorefining", D.L. Michell et al., Rockwell International, Jan. 30, 1989, pp. 1–23.

"Concerning the Redistribution of Beryllium Alkyis and Aryls with Beryllium Halides in Diethyl Ether," James R. Sanders, Jr. et al. Journal of the American Chemical Society, Nov. 6, 1968., pp. 6385–6390.

"Gmelin Handbook of Inorganic Chemistry", Be With Fluorine, Chlorine, Bromine, and Iodine. § 6.1.5.

*Primary Examiner*—Ngoclan Mai
*Attorney, Agent, or Firm*—Parkhurst & Wendel

[57] ABSTRACT

The invention provides a method for recovering metal beryllium from waste beryllium that has become radioactive in the reaction with neutrons, by converting the radioactive beryllium to halogenated beryllium with a halogen gas such as chlorine, bromine or iodine, and subsequently submitting the halogenated beryllium to thermal decomposition. In this way, the invention allows effective recovery of metal beryllium from waste, radioactive beryllium, thereby reducing production of radioactive wastes and ensuring an economical use of natural resources.

12 Claims, No Drawings

METHOD OF RECOVERING RADIOACTIVE BERYLLIUM

TECHNICAL FIELD

The present invention relates to a method of recycling radioactive beryllium whereby beryllium that becomes radioactive in the reaction with neutrons is deprived of oxides and radioactive impurities, and the recovered beryllium is available for reuse.

BACKGROUND ART

Heretofore, a method for recycling beryllium which becomes radioactive in the reaction with neutrons has never been thoroughly studied. In other words, there has been no method which allows recovery of pure metal beryllium from radioactive beryllium used in a nuclear reactor, by eliminating the latter of oxides and radioactive impurities.

In the future, when nuclear fusion reactors are put into practical use, a large amount of beryllium pebbles and blocks will be consumed. However, natural resources of beryllium are quite limited, and it has been thought necessary to develop a method whereby metal beryllium can be recovered from beryllium pebbles and blocks used in the reactor, because otherwise the natural resources would be soon exhausted or the cost of beryllium usage would rise sharply. The method for recovering metal beryllium from radioactive beryllium, which has been used in the reactor, thereby making it available for reuse, requires removal of oxides and radioactive impurities from the radioactive beryllium. However, as described above, no method has been offered heretofore that allows recovery of metal beryllium from radioactive beryllium and, as a result, exclusively beryllium from rare natural resources has been consumed in large amounts.

DISCLOSURE OF THE INVENTION

The present invention to provides a method whereby oxides and radioactive impurities are removed from beryllium that has become radioactive in the reaction with neutrons, to make the resulting metal beryllium available for reuse.

For satisfying such a demand, the inventors conducted thorough investigations seeking a method that allows removal of oxides and radioactive impurities from beryllium that became radioactive in the reaction with neutrons so that resulting metal beryllium is available for reuse, and successfully arrived at the present invention.

The method according to the present invention serves to recover metal beryllium from radioactive beryllium, and comprises a first step of allowing a halogen gas to react with radioactive beryllium to produce highly pure halogenated beryllium, and a second step of recovering metal beryllium from the halogenated beryllium.

The first step is to allow a halogen gas or any one of chlorine, bromine and iodine to react with radioactive beryllium to produce halogenated beryllium, and then to recover highly pure halogenated beryllium by making the use of its characteristic sublimation temperature. More precisely, in this step reaction is allowed to proceed at a temperature higher than the sublimation temperature of the halogenated beryllium or a temperature at which the produced halogenated beryllium exists in the form of a gas. However, if this temperature were set improperly high, the halogen would react with oxides such as beryllium oxide, or radio-active impurities such as $^{60}Co$. To limit such untoward reactions as much as possible, it is necessary to set the reaction temperature below the level about 100° C. higher than the sublimation temperature of the halogenated beryllium. This maneuver allows exclusive recovery of beryllium in the form of halogenated beryllium gas.

The second step concerns recovery of metal beryllium which takes place through thermal decomposition of highly pure halogenated beryllium separated and recovered in the first step. The thermal decomposition process consists, for example, of decomposing halogenated beryllium by heating it at a high temperature in the atmosphere of an inert gas, thereby converting it into metal beryllium. However, if halogenated beryllium were simply heated to a high temperature for decomposition, a fraction of the halogenated beryllium would remain unreacted, or minute particles of metal beryllium resulting from the decomposition process would react with the halogen to produce halogenated beryllium again, thus impairing the recovery of metal beryllium. To overcome such problem, the unreacted fraction of halogenated beryllium must be reduced with silane gas or a compound expressed as $Si_nH_{2n+2}$. The resulting halogenated beryllium whose part has been reduced with the silane gas dose not sublimate. Therefore, if this halogenated beryllium with no sublimation property is submitted to the thermal decomposition process, it will undergo thermal decomposition while being in the form of a solid, which will result in increased recovery of metal beryllium. The preferred silane to be used for this purpose includes mono- and disilane.

The preferred embodiments of the present invention will be described below in concrete terms and further detail.

As the preferred halogen gas to be used in the first step of this method, any one of chlorine, bromine and iodine can be employed. Chlorine or bromine can be used because of its having a higher vapor pressure even at room temperature, while iodine should be heated to be converted to a gas for use. In the latter case, an inert gas such as helium or argon should be preferably used as a carrier gas.

The reaction of the first step proceeds at a temperature higher than 350° C., or a temperature where the halogenated beryllium resulting from the reaction can exist as a gas. The preferred reaction temperature is about 100° C. higher than the sublimation temperature of the halogenated beryllium produced as a result of the reaction. This is because at such temperature oxides such as beryllium oxide or radioactive impurities such as $^6Co$ are prevented effectively from reacting with the halogen. The halogenated beryllium thus produced is heated to a temperature higher than its sublimation temperature, and through this procedure highly pure halogenated beryllium is separated/recovered in the form of gas. The halogenated beryllium thus produced is transferred to the reaction system in the next step whereby metal beryllium is extracted from it.

The second step is to recover metal beryllium from the highly pure halogenated beryllium produced at the first step, and can be achieved by two different courses: one is to subject the gaseous halogenated beryllium to a thermal decomposition process, and the other is to reduce the halogenated beryllium with silane or a compound expressed as $Si_nH_{2n+2}$ and to subject the resulting product to a thermal decomposition process.

The first course in the second step which consists of decomposing the halogenated beryllium by intense heating is to heat the gaseous halogenated beryllium to 1400° C. or higher, to decompose it into minute particles of metal halogen and gaseous halogen. The minute particles of metal beryllium thus obtained after the thermal decomposition is carried by a carrier gas to a cooling section to deposit for recovery. The usable carrier gas includes an inert gas such as helium or argon. If helium or a mixture of helium and argon were used as a carrier gas, it might lead to enhanced reduction of the halogenated beryllium in certain cases.

The second course in the second step which consists of reducing the gaseous halogenated beryllium with silane or a compound represented by $Si_nH_{2n+2}$ and of submitting the reaction product to a thermal decomposition process allows the gaseous halogenated beryllium to crystallize at a place where temperature is kept below the sublimation temperature of the halogenated beryllium, and reduces a fraction of the halogenated beryllium with silane gas. The halogenated beryllium whose part has been reduced as above loses a property to sublimate. Then, the halogenated beryllium that has lost a property to sublimate is heated to 1400° C. or higher to be decomposed into metal beryllium, a halogen gas and halogenated hydrogen.

The silane gas represented by $Si_nH_{2n+2}$ to be used to reduce a part of halogen constituting the halogenated beryllium is preferably monosilane or disilane. Silanes containing carbon such as methyl silane can also be used, but they are disadvantageous in that they tend to combine with beryllium to form carbides. The concentration of the silane gas is not specified here, but it should advantageously range from 1 to 80 vol %.

The reaction between halogenated beryllium and silane can take place at room temperature, but the reaction, to be suitable for the present purpose, should proceed while the halogenated beryllium or the reaction product is being extracted, which makes it preferable that the reaction takes place at a temperature higher than 80° C. and lower than the sublimation temperature of the halogenated beryllium. The reaction can last for any time as long as the time is long enough to allow the halogenated beryllium to lose a property to sublimate. The time varies depending on the concentration of the silane gas, but normally it is 1 to 50 hours. The halogenated beryllium which has lost a property to sublimate because of its part having been reduced is heated to 1400° C. or higher, to be decomposed into metal beryllium, a halogen gas and halogenated hydrogen.

According to the method of this invention which allows recovery of metal beryllium from halogenated beryllium, metal beryllium is recovered for reuse from beryllium that has become radioactive in the reaction with neutrons, after elimination of oxides and radioactive impurities from the latter.

More precisely, in the first step wherein used beryllium is converted to halogenated beryllium, highly pure halogenated beryllium can be separated/recovered through exploitation of its inherent sublimation temperature. Further, in the second step, the highly purified halogenated beryllium obtained in the first step is reduced as a pretreatment, and then submitted to thermal decomposition, to produce metal beryllium.

In the first step wherein highly purified halogenated beryllium is separated/recovered on the basis of the sublimation temperature specific to the halogenated beryllium, the reaction is allowed to proceed at a temperature higher than the sublimation temperature of the halogenated beryllium to produce the halogenated beryllium as a gas. However, if this temperature were set improperly high, the halogen would react with oxides such as beryllium oxide, or radio-active impurities such as $^{60}Co$. To limit such untoward reactions as much as possible, it is necessary to set the reaction temperature below about 100° C. higher than the sublimation temperature of the halogenated beryllium. This maneuver allows exclusive recovery of beryllium in the form of halogenated beryllium gas. Waste beryllium may contain impurities that may exist as gases such as tritium, but such impurities can be carried outside the system in the form of gases or halogenated gases, to be entrapped and disposed of.

In the second step wherein metal beryllium is recovered from halogenated beryllium, the effective reaction is thermal decomposition proceeding in an inert gas. However, if halogenated beryllium is simply heated to a high temperature in the presence of a carrier gas with no deliberate control from outside, a small fraction of halogenated beryllium will remain unreacted, and minute particles of metal beryllium produced as a result of the reaction will react with free halogen molecules to form halogenated beryllium again, thereby reducing the recovery of metal beryllium. As a measure to meet the problem, the gaseous halogenated beryllium is allowed to crystallize at a place where the temperature is kept below the sublimation temperature of the halogenated beryllium, a part of the halogen which constitutes the halogenated beryllium is reduced with silane gas, and the resulting product is submitted to thermal decomposition. The chemical processes underlying the reaction where a part of the halogen constituting the halogenated beryllium is reduced with silane gas or a compound expressed as $Si_nH_{2n+2}$ are as follows, when silane is chosen as the silane expressed as $Si_nH_{2n+2}$:

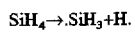

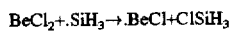

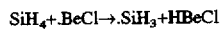

In this chain of reactions, radicals produced by unstable silane reduce a part of halogenated beryllium, and further modify it into a compound with a complicated structure. The compound with a complicated structure is polymerized and does not have a property to sublimate. Accordingly, when the halogenated compound where a part of the halogen component has been reduced and which has lost thereby the property to sublimate is submitted to a thermal decomposition process, it decomposes as a solid, which ensures a high recovery of metal beryllium.

The metal beryllium thus recovered can be made into beryllium pebbles or blocks to be reused for a nuclear fusion reactor. Namely, this invention allows a recycling of beryllium, or a rare, precious metal.

BEST MODE FOR CARRYING OUT THE INVENTION

EXAMPLE 1

A 1 g beryllium block which had been exposed to a neutron beam of $4.5 \times 10^{20}$ n/cm² was placed in a horizontal, tubular furnace, and was heated, while being kept in a quartz tube, to 400° C. Highly pure chlorine gas and highly pure argon gas were introduced at the rates of 50 cc/min and 100 cc/min respectively into the quartz tube in such a way that the two gases intermingled in the tube, until the whole amount of beryllium reacted with the halogen gas to form beryllium chloride. The beryllium chloride thus produced crystallized at the bottom of the quartz tube whose temperature was kept lower. About 99 wt % of the beryllium block was obtained as beryllium chloride. The residue consisted of beryllium oxide remaining unreacted and radioactive impurities like $^{60}$Co. A 96% or more of $^{60}$Co could be separated as unreacted residue. Tritium was captured in the form of a gas at the outlet, and 95% or more thereof was separated.

EXAMPLE 2

In the same manner as in Example 1, beryllium chloride was obtained. The beryllium chloride was allowed to exist as a gas in the quartz tube, into which a small, heating body made of SiC with a surface temperature of 1400° C. or higher was introduced to heat the beryllium chloride by contact for decomposition. The decomposition products were captured by a filter made of quartz wool placed downstream of the tube. The decomposition products were found to be a mixture of amorphous metal beryllium and beryllium chloride from X-ray analysis and elemental analysis. This metal beryllium was 99% or more free from $^{60}$Co and tritium.

EXAMPLE 3

In the same manner as in Example 1, beryllium chloride was obtained. The beryllium chloride in the form of a gas was introduced into the alumina tube of high purity which had been heated to 1800° C., to be heated for decomposition. The decomposition product was captured by a filter made of quartz wool placed downstream of the tube. The decomposition product was found to be crystalline metal beryllium from X-ray analysis and elemental analysis. This metal beryllium was 99% or more free from $^{60}$Co and tritium.

EXAMPLE 4

In the same manner as in Example 1, beryllium chloride was obtained. Introduction of chlorine gas was stopped, and hydrogen gas was introduced instead at a rate of 50 cc/min to intermingle with the gaseous beryllium chloride. The mixed gas, after being heated, was introduced into the alumina tube of high purity which had been heated to 1800° C., to be heated for decomposition. The decomposition product was captured by a filter made of quartz wool placed downstream of the tube. The decomposition product was found to be crystalline metal beryllium from X-ray analysis and elemental analysis. This metal beryllium was 99% or more free from $^{60}$Co and tritium.

EXAMPLE 5

Beryllium chloride was obtained in the same manner as in Example 1 except that an alumina tube of high purity was used instead of the quartz tube. Introduction of chlorine gas was stopped, and silane gas was introduced instead at a rate of 50 cc/min into the alumina tube to intermingle with the gaseous beryllium chloride there. The silane gas was allowed to react for 6 hours with beryllium chloride heated at 200° C. Then, after introduction of the silane gas was stopped, the beryllium chloride, while being heated at 1400° C., was exposed for 1 hour to a current of argon flowing at 100 cc/min, for decomposition. Recovery of the decomposition product was 85%. The decomposition product was found to be amorphous metal beryllium from X-ray analysis and elemental analysis. This metal beryllium was 99% or more free from $^{60}$Co and tritium. The metal beryllium was allowed to crystallize by heating to 1500° C. or higher.

EXAMPLE 6

The same method as in Example 5 was employed except that bromine gas was used instead of chlorine gas, and beryllium bromide was produced at 450° C. The beryllium bromide was allowed to react with silane gas at 180° C. for 3 hours, and was then heated at 1500° C. for decomposition, which produced metal beryllium. Recovery of metal beryllium was 87%.

EXAMPLE 7

The same method as in Example 5 was employed except that iodine was used instead of chlorine gas; iodine was placed in a vessel and heated to 150° C. to produce iodine gas which was transferred by a carrier gas of highly pure argon gas to the alumina tube of high purity where the iodine gas was allowed to react with radioactive beryllium at 460° C. to produce beryllium iodide. The beryllium iodide was allowed to react with silane gas at 180° C. for 3 hours, and was then heated at 1500° C. for decomposition, which produced metal beryllium. Recovery of metal beryllium was 75%.

EXAMPLE 8

The same method as in Example 5 was employed except that disilane gas was used instead of silane gas, and metal beryllium was obtained. The metal beryllium obtained through thermal decomposition at 1500° C. was submitted to X-ray analysis which revealed it was faintly contaminated with metal silicon.

INDUSTRIAL APPLICABILITY

According to this invention it is possible to achieve a high recovery of metal beryllium from waste beryllium which has become radioactive in the reaction with neutrons, by effectively removing the latter of oxides and radioactive impurities.

Because this method allows reuse of beryllium pebbles or blocks which are expected to be consumed in large amounts if nuclear fusion reactors come to be used more widely in the future, it would contribute to reduction of radioactive wastes and to effective use of natural resources.

What is claimed is:

1. A method of recovering radioactive beryllium, comprising a first step of producing halogenated beryllium by reacting a halogen gas with radioactive beryllium at a temperature above the sublimation temperature of the resulting halogenated beryllium and below a temperature 100° C. higher than that sublimation temperature and a second step of recovering metal beryllium from the halogenated beryllium.

2. The method of recovering radioactive beryllium according to claim 1, wherein the halogen gas to be used in the first step is one of chlorine, bromine and iodine.

3. The method of recovering radioactive beryllium according to claim 1, wherein, in the second step, halogenated beryllium in the form of vapor is heated to decomposition.

4. The method of recovering radioactive beryllium according to claim 1, wherein, in the second step, the halogenated beryllium is reduced by a silane expressed as $Si_nH_{2n+2}$, and the product is then submitted to thermal decomposition.

5. The method of recovering radioactive beryllium according to claim 4 wherein the silane gas expressed as $Si_nH_{2n+2}$ is at least either of monosilane and disilane.

6. A method of recovering radioactive beryllium, comprising a first step of producing halogenated beryllium by reacting a halogen gas with radioactive beryllium and a second step of recovering metal beryllium from the halogenated beryllium, said first and second steps being conducted in a substantially dry state.

7. The method of recovering radioactive beryllium according to claim 6, wherein the halogen gas to be used in the first step is one of chlorine, bromine and iodine.

8. The method of recovering radioactive beryllium according to claim 6, wherein, in the first step, the reaction temperature is kept above the sublimation temperature of the halogenated beryllium and below a temperature 100° C. higher than that sublimation temperature.

9. The method of recovering radioactive beryllium according to claim 6, wherein, in the second step, halogenated beryllium in the form of vapor is heated to decomposition.

10. The method of recovering radioactive beryllium according to claim 6, wherein, in the second step, the halogenated beryllium is reduced by a silane expressed as $Si_nH_{2n+2}$, and the product is then submitted to thermal decomposition.

11. The method of recovering radioactive beryllium according to claim 6, wherein the silane gas expressed as $Si_nH_{2n+2}$ is at least one of monosilane and disilane.

12. The method of claim 6, wherein the first step is carried out with a radioactive beryllium block.

* * * * *